Figure 1:
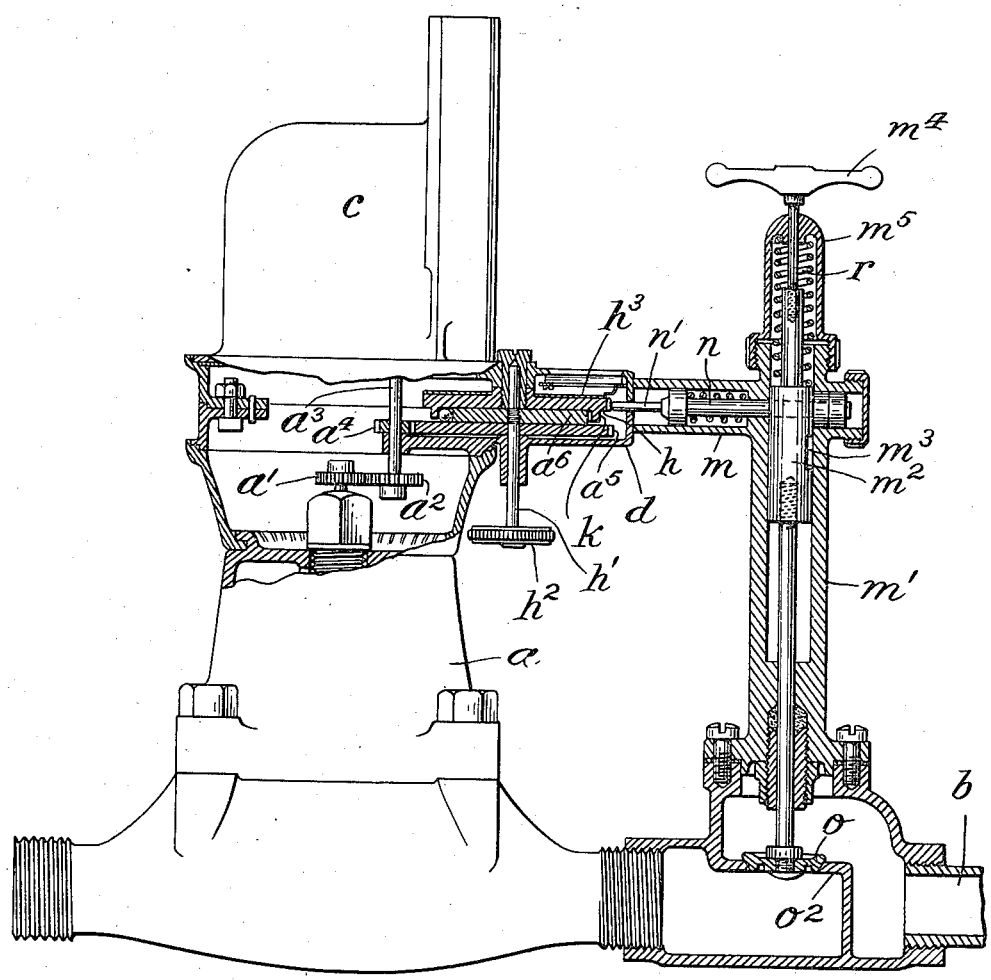

J. M. BURTON.
APPARATUS FOR DELIVERING MEASURED QUANTITIES OF LIQUID.
APPLICATION FILED APR. 4, 1912.

1,043,296.

Patented Nov. 5, 1912.

2 SHEETS—SHEET 1.

Attest:

Inventor:
James M. Burton
Redding & Greeley
Attys

J. M. BURTON.
APPARATUS FOR DELIVERING MEASURED QUANTITIES OF LIQUID.
APPLICATION FILED APR. 4, 1912.
1,043,296.
Patented Nov. 5, 1912.
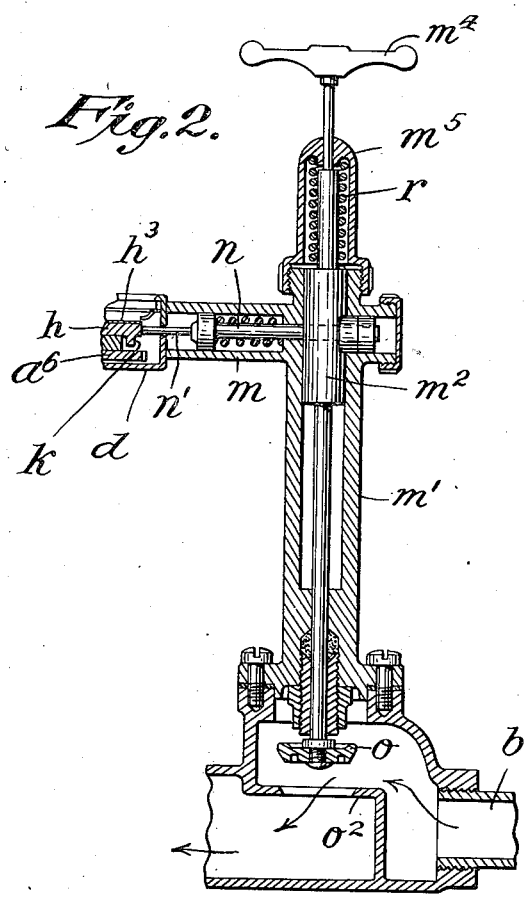
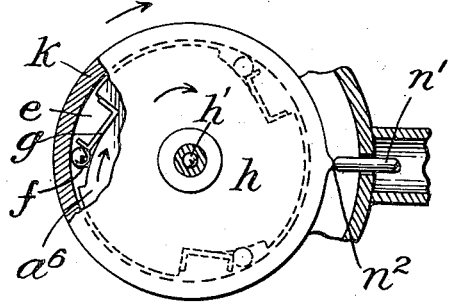
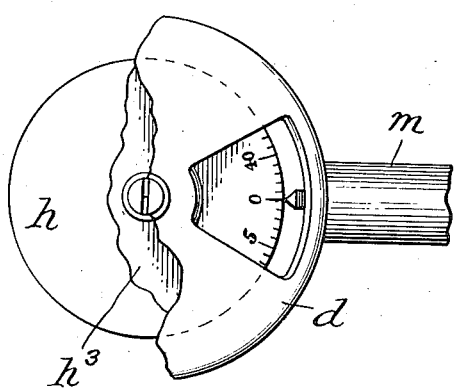
Attest:
Inventor:
James M. Burton
Redding & Greeley
Attys

UNITED STATES PATENT OFFICE.

JAMES M. BURTON, OF NEW YORK, N. Y., ASSIGNOR TO NEPTUNE METER COMPANY, OF NEW YORK, N. Y., A CORPORATION OF NEW JERSEY.

APPARATUS FOR DELIVERING MEASURED QUANTITIES OF LIQUID.

1,043,296. Specification of Letters Patent. Patented Nov. 5, 1912.

Application filed April 4, 1912. Serial No. 688,512.

*To all whom it may concern:*

Be it known that I, JAMES M. BURTON, a citizen of the United States, residing in Long Island City, in the borough of Queens of the city of New York, in the State of New York, have invented certain new and useful Improvements in Apparatus for Delivering Measured Quantities of Liquid, of which the following is a specification, reference being had to the accompanying drawings, which form a part thereof.

This invention relates to apparatus for delivering measured quantities of liquids, and is concerned particularly with apparatus for handling gasolene.

For the filling of automobile tanks with gasolene the common method is to pump or draw the gasolene into a measuring vessel, carry the measuring vessel to the automobile, and then pour the gasolene from the measuring vessel into the automobile tank. This method is accompanied with many inconveniences and some dangers. To overcome both the inconvenience and the dangers it has been proposed to pump the gasolene directly from the reservoir into the automobile tank or other like receptacle with a pump of determined capacity, the quantity delivered being indicated by a register which is operated by the movement of the pump plunger. This method is altogether unsatisfactory, because of its uncertainty; unless the structure of the pump is complicated by devices intended to insure complete movement of the pump plunger in each direction. It has also been proposed to deliver the gasolene through a displacement meter, the flow of gasolene being cut off by hand when the desired quantity has been delivered, but this method is unsatisfactory also because the accuracy of measurement depends first upon the certainty with which the operator cuts off the flow at the proper instant and again because the meter sometimes overruns through the acquired momentum of its parts.

It is the object of this invention to provide improved apparatus for delivering measured quantities of gasolene or any other liquid by which the flow of the liquid shall be stopped automatically when the predetermined quantity has been delivered.

The invention will be more fully explained hereinafter with reference to the accompanying drawings in which it is illustrated as embodied in a convenient and practical form and in which—

Figure 1 is a view in vertical section of the valve and the indicating mechanism, showing the meter and register in side elevation, Fig. 2 is a view in sectional elevation, showing the valve maintained in open position by suitable trip devices, Fig. 3 is a detail view partially in section of the tripping mechanism and clutch, Fig. 4 is a fragmentary plan view of the indicating dial.

A meter $a$ preferably of the disk type is introduced in the supply line $b$ at any desired point. This meter carries a pinion $a'$ on its axis, which engages with a gear $a^2$ fastened to a spindle $a^3$ which actuates the register $c$ as will be understood. In the present invention another pinion $a^4$ is keyed to the spindle $a^3$ and serves to actuate the indicating and cut-off devices as will appear hereinafter. Enmeshed with this pinion $a^4$ is a gear $a^5$ suitably mounted in a chamber $d$ carried by the meter casing. On the upper face of this gear a cam disk $a^6$, of reduced diameter is fastened. This cam disk has peripheral recesses $e$ in which are disposed rollers $f$ normally held outwardly by suitable stops $g$ all of which is most clearly shown in Fig. 3. A dial plate $h$ having an annular depending flange $k$ incloses the cam disk $a^6$ and the flange $k$ retains the rollers $f$ in their respective recesses $e$. The recesses are so inclined as to allow free relative movement of the cam disk and the dial plate when one of said members is rotated in one direction and to cause the rollers to act as wedges between the two when the other of said members is rotated in the same direction. By reason of this clutch action it will readily appear from Figs. 3 and 4 that the dial plate $h$ may be turned to any desired position, while operation of the meter is adapted to continue this rotation through the cam disk and rollers. Said dial plate has an operating spindle $h'$ fastened to it, said spindle extending downwardly freely through the cam disk $a^6$ and its supporting gear $a^5$. To facilitate rotation of the dial plate the spindle $h'$ may be provided with a knurled handle $h^2$. On the dial plate may be fastened an indicator face $h^3$ suitably graduated and readily visible through an opening in the top of the casing as indicated particularly in Fig. 4. Slidably disposed in a suitable casing $m$ is a spring pressed plunger $n$ having a pin $n'$ with a point normally in juxtaposition to the zero of the scale. In operation, however, the pin is adapted to be acted on by a projection $n^2$ on the periphery of the dial plate $h$ as will be explained. Removably disposed in a vertical casing $m'$ preferably integral with the casing $m$ is a plunger $m^2$ having a recess $m^3$ in which the head of the plunger $n$ is adapted to seat when said plunger $m^2$ is moved upwardly. The upward movement may be conveniently effected by means of a suitable handle $m^4$. This vertical plunger carries a valve $o$ seating in an aperture in a wall $o^2$ interposed between the supply line $b$ and the meter. This valve is held on its seat normally by the spring $r$ placed in a removable cap $m^5$ which may be threaded on the casing $m'$. As shown the valve $o$ is also subject to the pressure of the liquid which is being supplied. This construction minimizes the possibility of leakage, and makes the valve more sensitive.

In operation, the indicator scale is moved by means of the hand wheel $h^2$ until the desired numeral which may indicate in gallons the quantity to be delivered is opposite the pin $n'$. The valve and plunger $m^2$ are then raised by the handle $m^4$ until the head of the plunger $n$ seats in the recess $m^3$ of the vertical plunger $m^2$. As soon as the valve is opened, the flow of the liquid begins, the disk meter is set in operation and the cam $a^6$ is rotated. The movement of the latter is transmitted to the dial plate and face through the ball clutch. When the predetermined quantity of liquid has passed the meter, the projection $n^2$ on the dial plate contacts with the point of the pin $n'$ forcing the head of plunger $n$ from its seat in the recess $m^3$ and permitting the valve to be instantly closed under the action of the spring $r$ and the pressure of the liquid. Simultaneously movement of the meter and the parts geared thereto ceases.

Modifications in the arrangement and form of the parts may be made without departing from the spirit of the invention.

I claim as my invention:—

1. In combination with a meter, a valve, means acting upon the valve to close it, a detent to hold said valve from its seat, an adjustable dial, means carried by said dial to release said detent and a clutch interposed between said dial and said meter, said dial being independently movable in one direction whereby the means carried thereby may be caused to act on said detent after the flow of any desired quantity of liquid.

2. In combination with a meter, a spring pressed valve, a detent to hold said valve from its seat, an adjustable dial, means carried by said dial to release said detent and a clutch interposed in the connection between said dial and said meter, said dial being independently movable in one direction whereby the means carried thereby may be caused to act on said detent after the flow of any desired quantity of liquid.

3. In combination with a meter, a valve controlling the flow of liquid therethrough, means in operative connection with the meter for automatically closing the valve after the flow of a predetermined quantity of liquid, and a clutch interposed between said last named means and the meter to prevent the independent movement in one direction only of said means whereby the same may be caused to close the valve after the flow of any desired quantity of liquid.

This specification signed and witnessed this 3rd day of April A. D., 1912.

JAMES M. BURTON.

Witnesses:
E. M. TAYLOR,
WORTHINGTON CAMPBELL.